June 19, 1934.   P. W. DIETER   1,963,547
JOURNAL BOX AND BEARING STRUCTURE
Filed Nov. 12, 1931   2 Sheets-Sheet 1
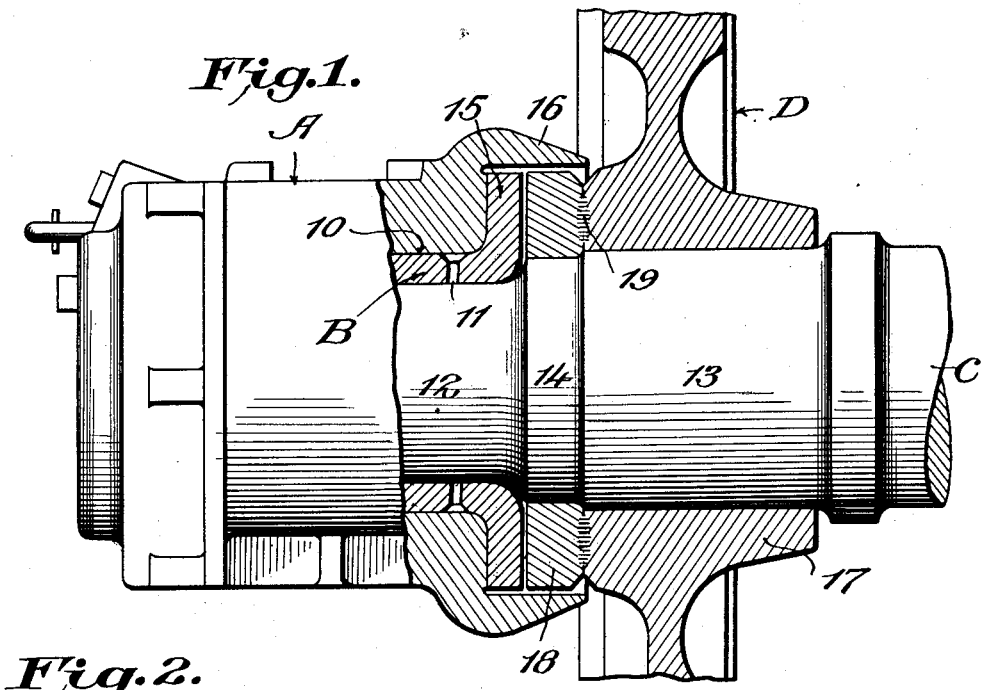
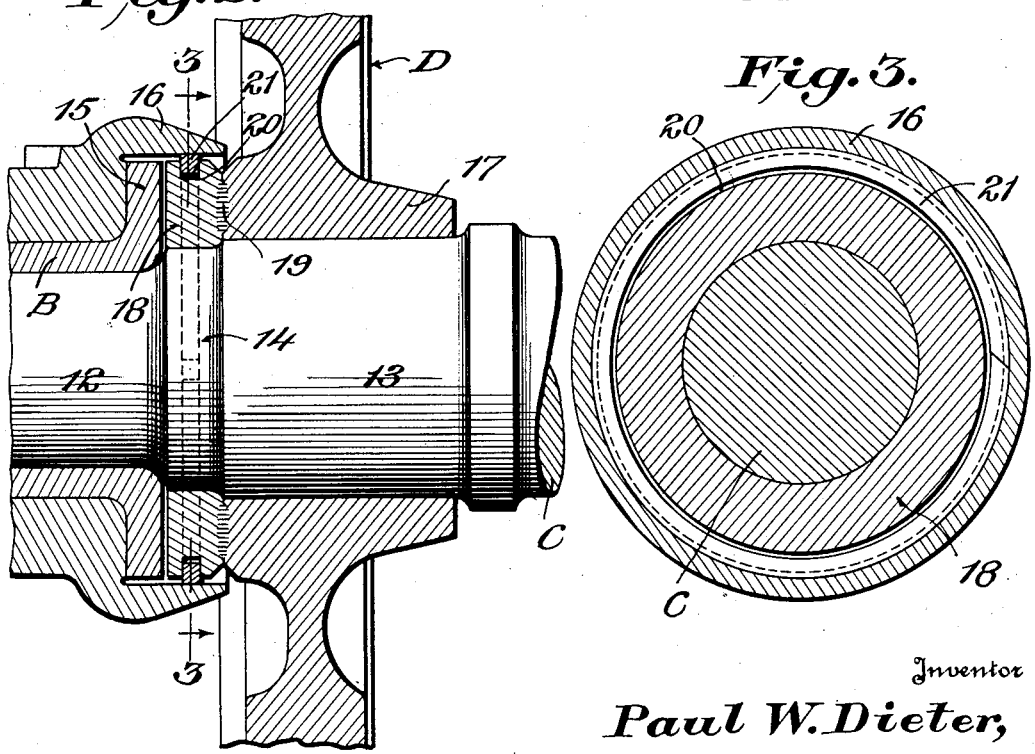
Inventor
Paul W. Dieter,
By D. P. Wolhaupter
Attorney June 19, 1934.   P. W. DIETER   1,963,547
JOURNAL BOX AND BEARING STRUCTURE
Filed Nov. 12, 1931   2 Sheets-Sheet 2
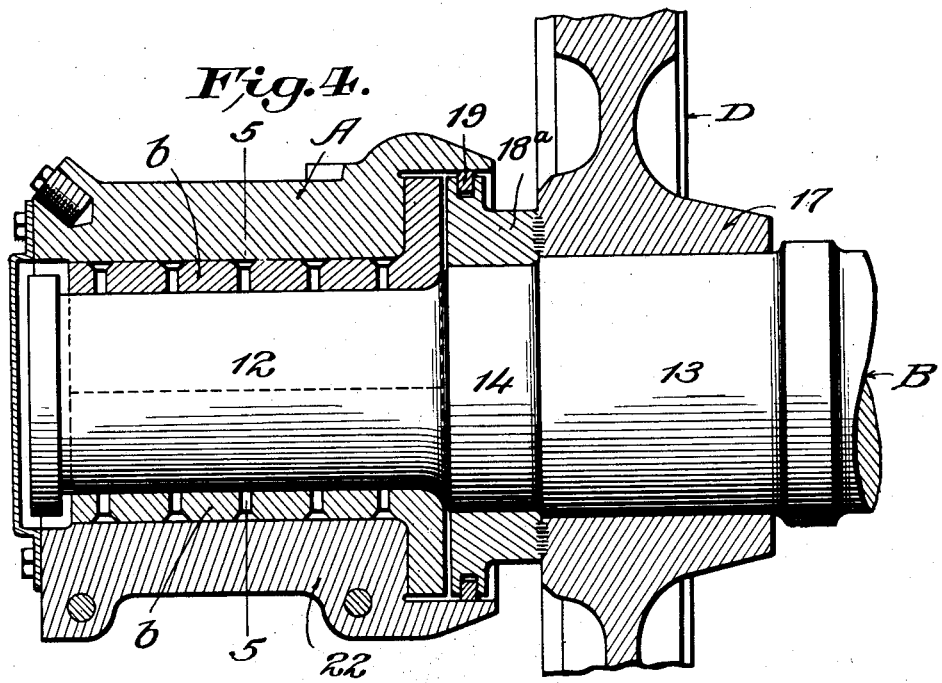
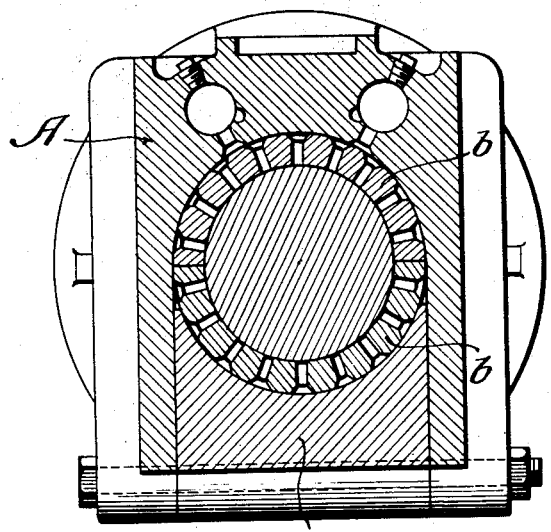
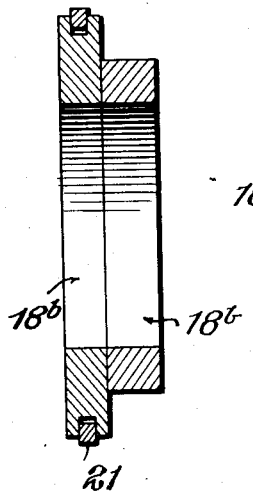
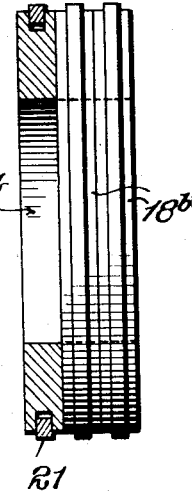
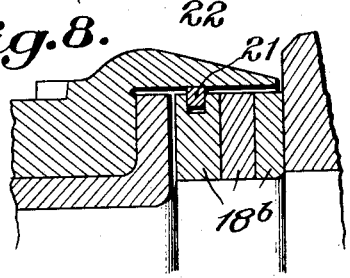
Inventor
Paul W. Dieter,
Attorney Patented June 19, 1934

1,963,547

UNITED STATES PATENT OFFICE 1,963,547

JOURNAL BOX AND BEARING STRUCTURE

Paul W. Dieter, New York, N. Y., assignor, by mesne assignments, to P. W. Dieter, Inc., New York, N. Y.

Application November 12, 1931, Serial No. 574,663

3 Claims. (Cl. 308—40)

This invention relates to an improved journal box and bearing structure for the axles of car wheels and the like, and has particular reference to an improved journal box and bearing structure of the type in which the bearing element for the axle journal is mounted for rotation within the journal box.

A bearing element in the form of a hollow cylinder which is mounted for rotation within a journal box, and which is adapted to be rotated during rotation of the axle which is journaled therein, is desirable from a number of viewpoints and is particularly advantageous in that it possesses long life due to different portions thereof constantly being brought to an effective load sustaining position between the top of the journal box and the top of the axle journal. However, as heretofore produced, journal boxes and bearing structures of this type have not been entirely satisfactory principally because of the labor and expense necessary to adapt them to standard axles. That is to say, in order to provide for rotating the bearing element during rotation of the axle, which purpose is not accomplished by friction between the axle journal and the bearing, it is usual to provide for frictional contact between the inner end of the bearing element and the adjacent face of the hub of the wheel which is fixed on the axle so that as the axle and the wheel rotate this frictional engagement produces rotation of the bearing element. However, since standard car axles usually are of stepped design, i. e., provided between the journal portion thereof and the portion thereof on which the wheel is mounted with a dust guard seating portion which is of greater diameter than the journal portion and of less diameter than the portion on which the wheel is mounted, it has been found necessary heretofore either to turn or to grind down the dust guard seating portion to the same diameter as the journal portion in order to permit the inner end of the bearing element to extend to the wheel hub, or else to provide at relatively great expense a bearing element with an inner end extension having a bore larger than the journal receiving bore thereof to accommodate the dust guard seating portion thus to permit the desired driving engagement of the wheel hub with the inner end of the bearing element. Moreover, since the wheel hub usually is in the form of a more or less unfinished casting, it also has been necessary heretofore to machine the end face thereof for cooperation with the inner end of the bearing element. Therefore, in either case material expense obviously is involved. Moreover, it is difficult in either case to provide a practical and efficient means to exclude dust and dirt from the space between the inner end of the bearing element and the adjacent end of the wheel hub due to the impracticability of extending any part of the journal box appreciably inwardly over the wheel hub. Accordingly, the general object of the present invention is to provide for the driving or rotation of the bearing element by the wheel hub in a simple, inexpensive manner not requiring machining or reforming of the standard axle or the wheel as the provision of a special bearing element of expensive design, and in such manner as to permit the employment of a simple, practicable and efficient means to exclude foreign matter from the space between the inner end of the bearing element and the adjacent face of the bearing element driving part, as well as to permit the use of oil as distinguished from more or less heavy grease in the lubrication of the structure.

With the foregoing and other objects in view, which will become more fully apparent as the nature of the invention is better understood, the same consists in the novel construction, and in the novel combination and arrangement of features as will be hereinafter more fully described, illustrated in the accompanying drawings and defined in the appended claims.

In the drawings, wherein like characters of reference denote corresponding parts in the different views:—

Figure 1 is a longitudinal section through a journal box and bearing structure according to one practical embodiment of the invention.

Figure 2 is a fragmentary section similar to Fig. 1 illustrating a slight modification.

Figure 3 is a section on the line 3—3 of Fig. 2.

Figure 4 is a view similar to Fig. 1 illustrating another slight modification of the invention.

Figure 5 is a cross section on the line 5—5 of Fig. 4.

Figures 6, 7 and 8 are detail views illustrating other alternative forms of the means for transmitting rotation of the wheel to the bearing element.

Referring to the drawings in detail and with particular reference to the embodiment of the invention illustrated in Fig. 1, A designates, generally, the journal box, B the bearing element, C the axle, and D the wheel fastened to the axle inwardly of the journal box.

The journal box A, which may be of any suitable construction, is inclusive essentially of a bore 10 to receive the bearing B which is in the form of a sleeve rotatably mounted in said bore, the sleeve having numerous lubricant ducts 11 formed therethrough and the journal box being provided with any suitable means to supply lubricant to the outer face of said sleeve and through the ducts 11 to the inner face thereof, thereby to provide for free rotation of the sleeve within the journal box and for free rotation of the journal portion 12 of the axle within the sleeve.

Regarding the axle C, it will be observed that the same is of a well known standard design having in addition to the journal portion 12 thereof, a portion 13 of relatively large diameter on which the wheel D is fixed, and, further having, between the portions 12 and 13, a portion 14 of relatively short length which is of greater diameter than the journal portion 12 and of less diameter than the wheel mounting portion 13 and which is usually provided to constitute a seat for the dust guard of an ordinary journal box.

Because of the dust guard seating portion 14 of the axle being of greater diameter than the journal portion 12 thereof the prior practice, as heretofore stated, has been either to turn or to grind down the portion 14 to the same diameter as the journal portion 12 in order to permit the use of a bearing element of economical structural design to extend at its inner end into contact with the wheel hub, or else to provide a bearing element of more expensive design to extend at its inner end over the portion 14 into operative relation to the wheel hub. As distinguished from either of the foregoing expedients, the present invention provides for the use of a bearing element of simple, inexpensive design, avoids any necessity of machining the axle, and at the same time provides for the effective exclusion of foreign matter from the space between the adjacent ends of the bearing element and the wheel hub and the retention of the lubricant within the journal box in a simple, practicable and thoroughly efficient manner.

According to the embodiment of the invention illustrated in Fig. 1 the bearing element B accommodates only the journal portion 12 of the axle and is provided at its inner end with an outwardly directed flange 15 which seats against the inner end of the journal box and is surrounded by an inwardly directed flange or extension 16 of the journal box which extends well inwardly beyond said flange 15. The inner face of the flange 15 thus is spaced from the adjacent end face of the hub 17 of the wheel D an amount approximately equal to the length of the portion 14 of the axle. Consequently, in order to provide for driving the bearing element B by the wheel hub 17, a collar 18 bored to fit the portion 14 of the axle and of a thickness or width approximating the spacing of the flange 15 from the adjacent face of the wheel hub, is engaged over said axle portion 14 and fixed to the axle or to the wheel hub in any suitable manner for rotation therewith. For example, the collar may be welded to the wheel hub as indicated at 19. Thus it is obvious that as the axle rotates within the bearing element B rotation of the wheel produces, through the collar 18, rotation of the bearing element due to frictional contact between the adjacent faces of the flange 15 and the collar 18, this frictional engagement occuring whenever there is a slight relative inward movement of the journal box and the axle, as frequently or substantially continuously occurs while a car is in motion. It is apparent, therefore, that while the present arrangement provides for driving of the bearing element B by the axle or the wheel mounted thereon, all necessity of machining the axle or the wheel hub or of providing a bearing element of special expensive design is avoided. Moreover, it is apparent that by reason of the contacting faces of the flange 15 and the collar 18 being spaced from the adjacent end of the wheel hub, the flange 16 may be extended well inward over said contacting faces so as to effectively exclude foreign matter therefrom.

In connection with the exclusion of foreign matter from the contacting end faces of the bearing element flange 15 and the collar 18, it is apparent that if desired the collar 18 may be provided with a peripheral groove or grooves for the reception of a split ring or rings for sealing cooperation with the inner face of the flange 16, this being illustrated in Figs. 2 and 3 wherein a groove in the collar 18 is designated as 20 and a split ring fitting said groove and sealing against the inner face of the flange 16 is designated as 21, the general arrangement otherwise being the same as illustrated in Fig. 1. When a ring or rings 21 is or are used, not only is foreign matter effectively excluded from the adjacent faces of the flange 15 and the collar 18, but lubricant obviously is prevented from escaping from the journal box. Accordingly, the present arrangement provides for the use of oil or liquid lubricant as distinguished from grease in the lubrication of the structure.

Figs. 4 and 5 of the drawings illustrate an embodiment of the invention which is fundamentally the same as the embodiments of the invention illustrated in Figs. 1 to 3 and indicate that in case the dust guard seating portion 14 of the axle is of material length the collar, designated as 18$^a$, may be of reduced diameter towards its outer end. These figures of the drawings also illustrate that the bearing element may be formed in two cooperating half sections designated as $b$, $b$, to facilitate their assembly with the journal box and the axle, especially in instances where the front end of the journal box is closed and the front end of the axle journal is flanged, the journal box under these conditions preferably having a drop bottom 22 which may be dropped to permit insertion and removal of the bearing element sections.

As illustrated in Figs. 6 to 9 of the drawings the collar between the inner end of the bearing element and the hub of the wheel may comprise a plurality of collar elements 18$^b$ separate from each other and disposed in abutting end to end relation. These figures also indicate that the respective collar elements may be of different diameters and that any one or more of the same may be provided with one or more sealing rings. They also indicate that it is not essential to fasten the collar, whether it is composed of only a single element or a plurality of elements, either to the wheel or the axle.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A structure of the character described comprising a journal box, a bearing rotatably mounted therein, an axle journaled in said bearing, a wheel fixed to the axle inwardly of the journal box, a collar fixed with reference to the axle and arranged between the hub of the wheel and the inner end of the bearing, said collar being operable by frictional contact to transmit rotation of the wheel to the bearing, and an inwardly directed flange extension of the journal box overlying the inner end of the bearing and the adjacent portion of the collar.

2. A structure of the character described comprising a journal box, a bearing rotatably mounted therein, an axle journaled in said bearing, a wheel fixed to the axle inwardly of the journal box, a collar fixed with reference to the axle and arranged between the hub of the wheel and the inner end of the bearing, said collar being operable by frictional contact to transmit rotation of the wheel to the bearing, an inwardly directed flange extension of the journal box overlying at least a portion of the collar, and sealing means between said flange and said collar.

3. A structure of the character described comprising a journal box, a bearing rotatably mounted therein, an axle journaled in said bearing, a wheel fixed to the axle inwardly of the journal box, a collar fixed with reference to the axle and arranged between the hub of the wheel and the inner end of the bearing, said collar being operable by frictional contact to transmit rotation of the wheel to the bearing, an inwardly directed flange extension of the journal box overlying at least a portion of the collar, the collar having a peripheral groove, and a sealing ring disposed in said groove and sealing against the inner face of said flange.

PAUL W. DIETER.